April 9, 1968 TSUNEO NAKAHARA ETAL 3,377,587
TRAIN OPERATION CONTROL SYSTEM AND METHOD
OF OPERATING THE SAME
Filed Oct. 26, 1966 4 Sheets-Sheet 1
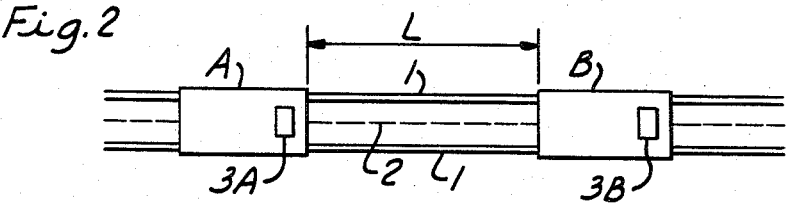
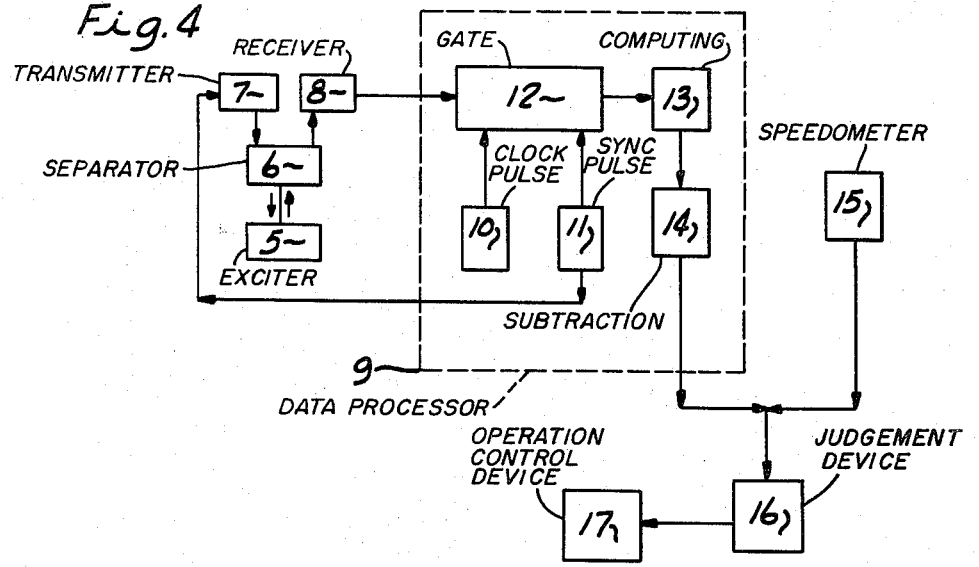
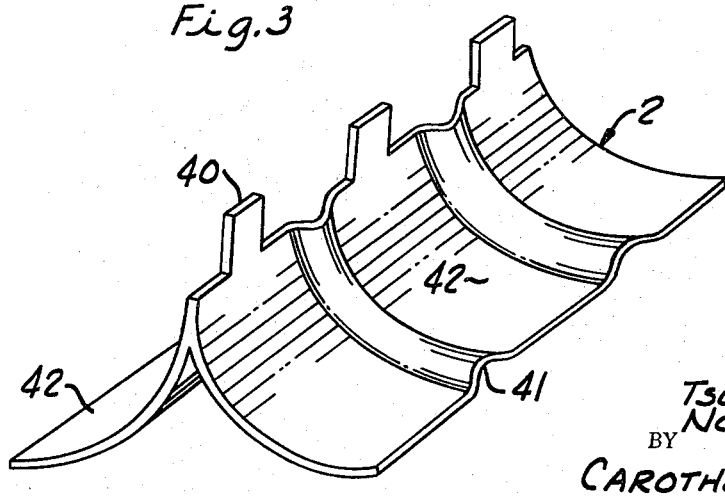
INVENTORS
TSUNEO NAKAHARA &
NORITAKA KURAUCHI
BY
CAROTHERS & CAROTHERS
THEIR ATTORNEYS

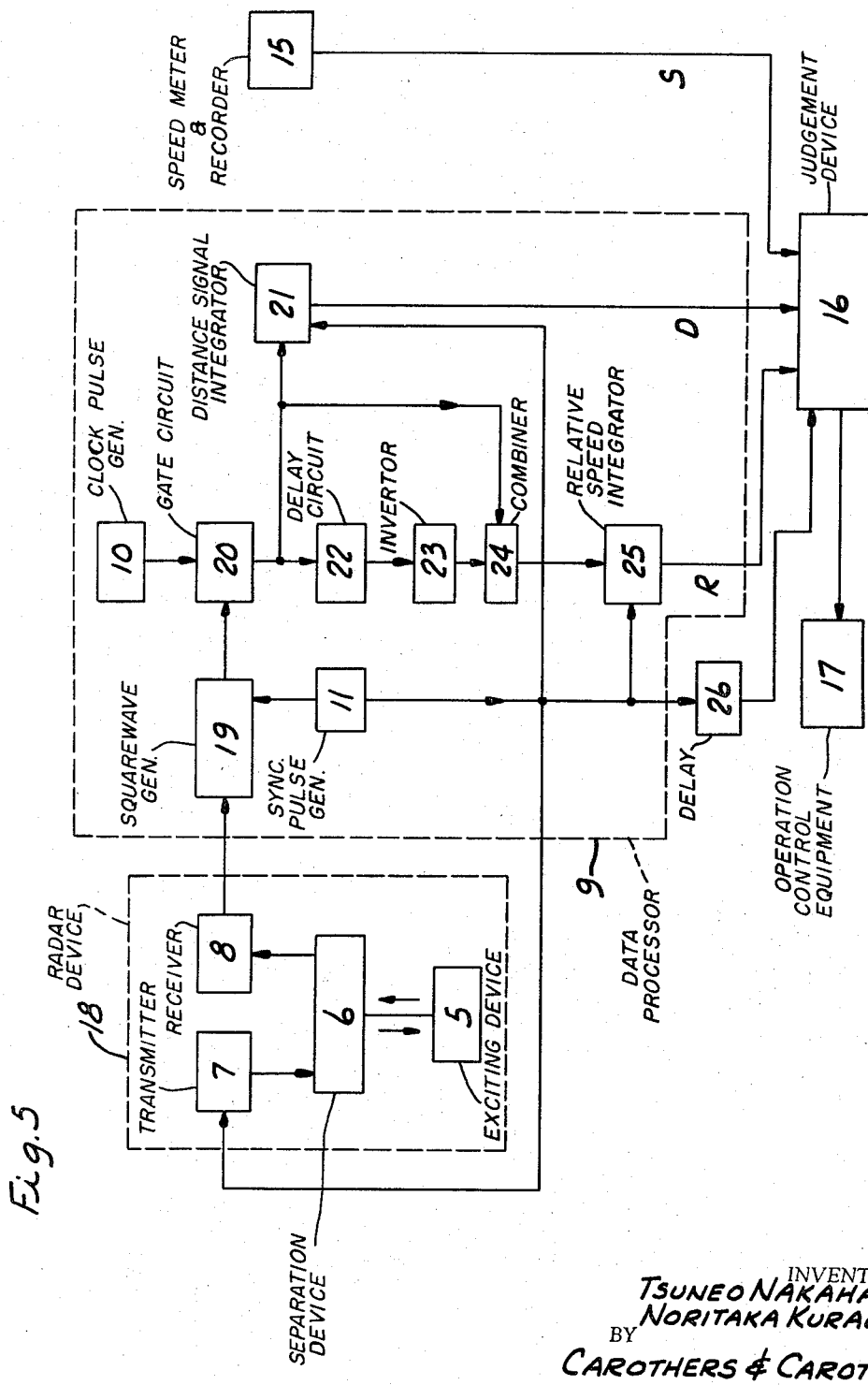

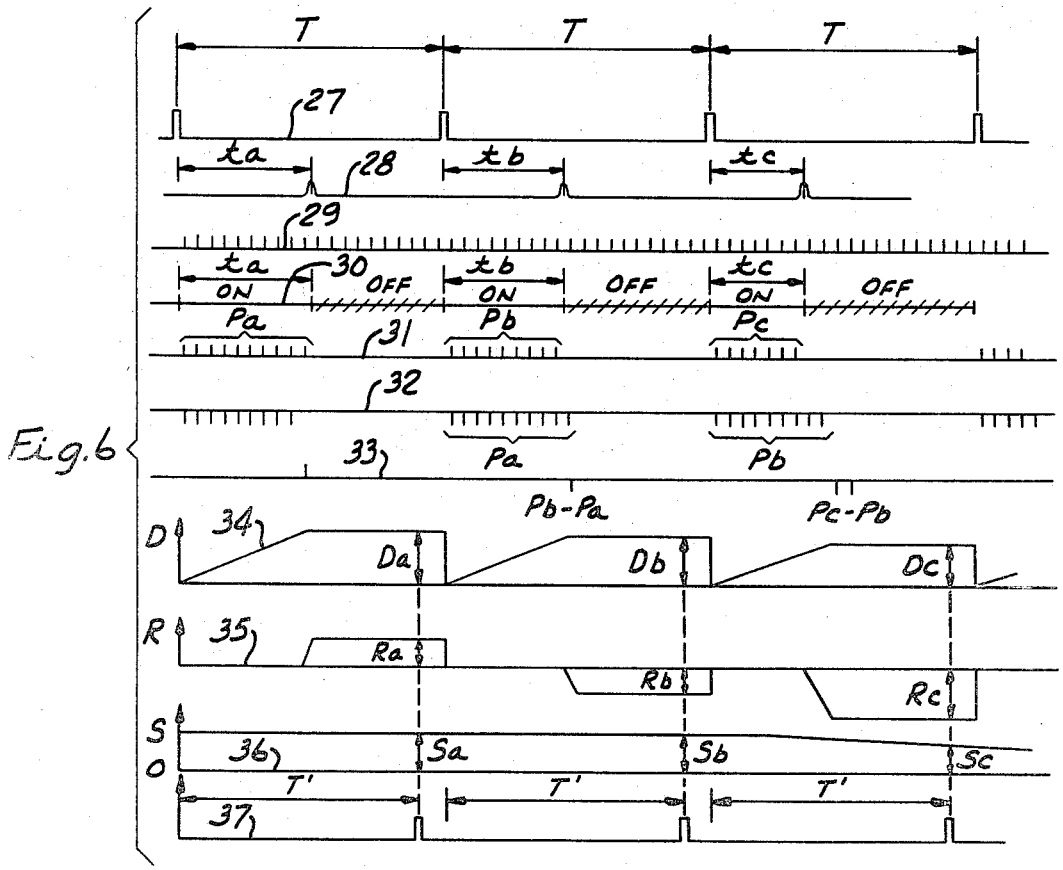

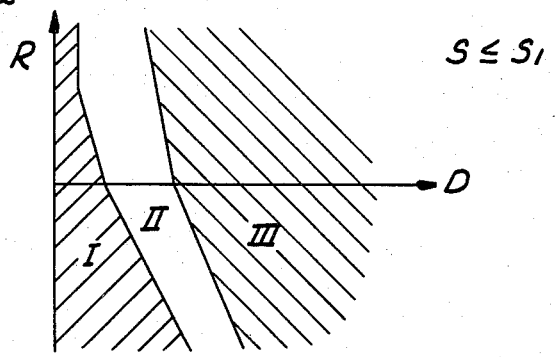
Fig. 7a  $S \leq S_1$
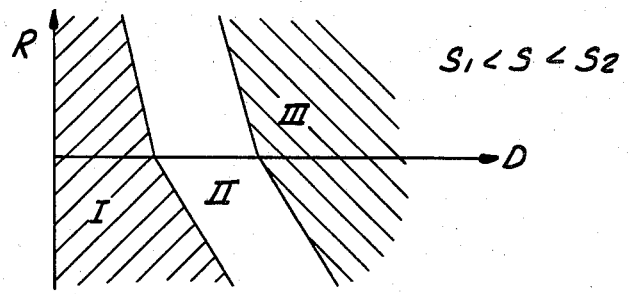
Fig. 7b  $S_1 < S < S_2$
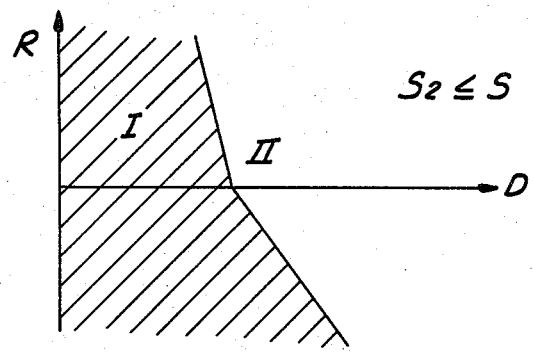
Fig. 7c  $S_2 \leq S$ United States Patent Office 3,377,587
Patented Apr. 9, 1968

3,377,587
TRAIN OPERATION CONTROL SYSTEM AND
METHOD OF OPERATING THE SAME
Tsuneo Nakahara, Nishinomiya-shi, and Noritaka Kurauchi, Suita-shi, Japan, assignors to Sumitomo Electric Industries, Ltd., Osaka, Japan, a Japanese company
Continuation-in-part of application Ser. No. 333,439, Dec. 26, 1963. This application Oct. 26, 1966, Ser. No. 589,704
12 Claims. (Cl. 343—7)

ABSTRACT OF THE DISCLOSURE

A radar operation control system for a subject vehicle and method of processing the radar data wherein a radar pulse is synchronously transmitted and thereafter received as reflected from an obstacle in the vehicle path to measure off a train of clock pulses proportional in number to the distance between the vehicle and the obstacle. Each clock pulse train is compared with a succeeding pulse train to determine the relative speed of the vehicle in relation to the obstacle by detecting an increase or decrease in pulse number and the difference in pulse number. This information is evaluated along with the distance and the speed of the subject vehicle with reference to predetermined criteria to control the operation of the vehicle accordingly.

---

This application is a continuation-in-part of application Ser. No. 333,439, filed Dec. 26, 1963, now abandoned.

This invention relates to a vehicle operation control system and the method of operating the same in which a metallic surface wave transmission line is installed along the railroad track and the operation of trains is controlled through the use of the same by the processing of pulse intelligence.

The train operation control systems heretofore in use may be divided into two major classifications of the fixed block system and the moving block system. The fixed block system may further be divided into the block signal system in which the railroad track is divided into sections and a signal is installed at each section point and the tablet system in which the distance between one station and another is made a section. In either case, the fixed block system allows only one train to be alloted to one section, so that the number of trains to be operated is limited. Furthermore, it is necessary to install a signal for each section of the track which is newly constructed, so that the equipment for train control is found expensive.

On the other hand, a radar system using antennas is known as a mobile block system. This is a system in which each train is equipped with a radar as a means to exchange information between running trains and wherein a space wave is used between them and the base station. In such a system, it is necessary to give a broad directivity to the electric wave on curved courses where the visibility of the vehicle path ahead is poor, since it makes use of space waves. Furthermore, communication becomes impossible where there exists a tunnel, hill or some other obstruction to a space wave. The use of space waves also interferes with other space waves communication and has a drawback of being interfered with by other communication space waves.

An object of the present invention is to provide a train control system and method of operating the same which is devoid of these disadvantages. The system of the present invention employs a metallic surface wave transmission line as a medium for the transmission of guided waves thereby eliminating the disadvantages found with the use of space waves.

Another object is to provide a train control system and method of train control wherein a train is controlled to have an appropriate speed in accordance with the distance to and relative speed of the train and an obstacle in advance of the train such as another train or a dangerous obstacle lying in the vicinity of the tracks.

Another object of the present invention is the provision of a metallic surface wave transmission line as a medium for the transmission of guided waves. Parallel wire transmission line or dielectric coated single conductor transmission line has been used for the same purpose. However, we have made investigation on the application of these transmission systems to train control and have come to the conclusion that a metallic surface wave transmission line with a comb or dentiform structure is the only practical line suitable for our purpose, when considering such characteristics as its stable attenuation, high sensitivity in detecting obstacles, high uniformity to avoid spurious reflections, high stability against contamination and high mechanical strength. Parallel wire transmission line with a dielectric coating is economical, but its impedance is not influenced very much so as to cause reflection with obstacles near the line, since the electromagnetic field is concentrated between the wires. Further, attenuation in the UHF band is significantly increased when the surface of the insulation gets wet or dewed. A dielectric coated single conductor can be used as a surface wave transmission line but attenuation is seriously increased by dust or water on the surface of the dielectric. The metallic surface wave transmission line of an appropriate design has proved to have very stable transmission properties regardless of rain or dust on the line. This difference in the influence of dust and rain on attenuation comes from the fact that the conductive or resistive film on the surface of a dielectric material disturbs the electromagnetic field much more than the film on the surface of a conductive material. As the electromagnetic field of the surface wave extends to the space around the line, the comparatively large reflection waves are created by obstacles near the line. Very close coupling between the line and the antenna on the train can be easily obtained for the same reason. These facts make it possiblet o obtain a reliable train control system with the metallic surface wave transmission line.

Another object of the present invention is to provide a train control system and a method of train control wherein the distance to the preceding train or the obstacle is measured with digital technique. While the systems so far proposed transform the distance or the relative speed to the preceding train directly to a voltage magnitude or value, the system of this invention measures these values with the number of clock pulses emitted during the time between the radar pulse is transmitted and received. Since this system enables the application of digital technique to the data processor, high accuracy in the measurement of the relative speed and a system more reliable against the noise or instability of the power source is realized.

Another object of the present invention is to provide a train control system and a method of train control which employs a metallic surface wave transmission line which minimizes the attenuation constant at an arbitrary frequency and which is not subject to damage due to thermal expansion and shrinkage.

Other objects and advantages appear hereinafter in the following description and claims.

The accompanying drawings show for the purpose of exemplification without limiting the invention or claims thereto, certain practical embodiments illustrating the principles of this invention wherein:

FIG. 1 is a cross sectional view of the railroad rails and the surface wave transmission line installed in parallel with them.

FIG. 2 is a diagrammatic plan view illustrating an embodiment of the train operation control system of this invention.

FIG. 3 is a view in perspective which illustrates the metallic surface wave transmission line of FIG. 1.

FIG. 4 is a block diagram for the control system shown in FIGURE 2.

FIG. 5 is a block diagram showing the control system of FIG. 4 in greater detail.

FIG. 6 is a graphical view illustrating the wave forms at various points in the control system of FIG. 5.

FIGS. 7a, b and c are graphical plots illustrating an example of the function of the judgment device in the control system of FIG. 5.

In the figures, 1 denotes the railroad rails, and 2 the metallic dentiform surface wave transmission line installed in parallel with the aforementioned railroad rails.

In FIG. 2 two trains A, B are shown on the rails 1. Each train is equipped with control equipment, 3A or 3B, which contains a radar device, a data processor and a judgment device. Pulse modulated waves are transmitted from the radar device to the surface wave transmission line in the forward direction of the train through an antenna on the train. The waves from the train A are propagated along the surface wave transmission line 2 to preceding train B and are reflected at train B. The reflected waves are received by the radar device and the distance and the relative speed are measured with a data processor in the equipment 3A. The train is controlled to ensure a safe operation with this information on the preceding train. When there is an obstacle on the track instead of the preceding train, the waves are reflected in the same way and the train is controlled not to hit the obstacle.

FIG. 3 shows a structure of the metallic surface wave transmission line of this invention. The line is made of a material with a high electric conductivity such as aluminum. The line has an inverse Y-shaped cross-section with comb or dentiform structure 40 on the top of the vertical part and has corrugations 41 between adjacent tips of the comb structure. Comb structure 40 has a delay effect on the electromagnetic waves and a surface wave is propagated along the comb structure. Corrugation 41 absorbs the longitudinal thermal expansion or shrinkage of the material. The straightness and the uniformity of the comb pitch is preserved against temperature change in this manner. The sloping plates 42 at both sides are shields against the earth as well as mechanical stabilizers, and prevent rainwater or dust from sticking on the surface of the guide.

The energy transmitted along the Y-guide 2 is concentrated around the teeth 40 of the Y-guide, and the field intensity exponentially decays in the transverse direction in proportion to the distance from the teeth. By varying the depth or the width of the teeth, it is possible to adjust the concentration degree of the energy. The more the energy is concentrated around the teeth, the more the ohmic loss becomes.

On the other hand, the more the energy is extended, the more the loss absorbed by the ground becomes. Therefore, it is possible to design the Y-guide so that the attenuation constant constant may be minimized at an arbitrary frequency by varying the sizes of either the teeth or the shield plates 42.

FIG. 4 is a block diagram of a simplified control mechanism in the control system of each train shown in FIG. 2 wherein 5 denotes the exciting device or coupler, 6 the transmission and reception separator or duplexer, 7 the transmitter, 8 the receiver and 9 data processor. The details of it are shown by 10–14. 10 denotes the pulse oscillator, 11 the synchronizing signal generator, 12 the gate circuit, 13 the computing device, 14 the subtraction device including memory circuits, 15 the self-train speed meter and recorder, 16 the overall judgement device, and 17 the self-train control device.

The electric wave from the transmitter 7 of the self-train or subject train A via the transmission-reception separator 6 is excited onto the surface wave transmission line 2 by the exciting device 5. The excited wave propagates on the surface wave transmission line 2 towards the preceding train B and comes back towards the self-train A, reflected by the preceding train B and propagated on the surface wave transmission line 2 in the same manner as the transmission wave. This reflected wave is caught by the exciting device 5 of the self-train A and sent to the receiver 8 via the transmission-reception separator 6. The reflected wave received by the receiver 8 becomes the deenergizing signal of the gate device 12 in the data processing mechanism 9. On the other hand, the pulse oscillated by the clock pulse oscillator 10 in the data processing mechanism 9 and the synchronizing signal oscillated by the synchronizing signal oscillator 11 are transmitted to the gate circuit 12. The synchronizing signal of a synchronous period T becomes the energizing signal of the gate circuit 12 and the triggering signal for the pulse modulated wave transmitter. The pulses having a fixed interval from the pulse oscillator 10 pass the gate circuit 12 and reach the computing device 13 only during the time from the energizing signal of the synchronizing signal to the deenergizing signal due to the reflected wave. The energized time $t$ of the gate circuit 12 varies as the distance L between the self-train A and the preceding train B varies. Consequently, the number of input pulses P to the computing circuit 13 is proportional to L. Hence, the ratio of variation in the number of pulses P from one synchronous period to the next represents the relative speed of the self-train A and the preceding train B.

This relative speed is obtained by putting the output signal of the computing device 13 in the subtraction device 14 including the memory circuits and detecting the stored difference in pulse count output at intervals of a fixed time.

Analyzing the distance and the relative speed signals from 14 and the signal obtained from the speed meter and recorder 15 of the self-train by means of the overall judgement device 16, the train control device 17 is operated automatically or manually on self-train A.

FIG. 5 is a more detailed block diagram of the control system in which radar device 18, data processor 9, speedometer 15 and judgement device 16 are included. Train operation equipment 17 is operated in accordance with command from judgement device 16. The control system is operated periodically with the synchronous pulse train generated by the synchronous pulse generator 11. Radar transmitter 7 transmits a pulse modulated with a high frequency wave synchronized with the synchronous pulse. The pulse waves are transmitted to the surface wave transmission line through transmitter-receiver separation device 6 and the exciting device 5. The waves reflected by a preceding train or an obstacle are received by radar receiver 8 through the exciting device 5 and separation device 6. The receiver transmits a signal to a square wave generator 19, when it receives the reflected pulse. The square wave generator 19 transmits a square wave, that steps up with the synchronous pulse from the synchronous pulse generator and steps down with the signal from the receiver. When the square wave from square wave generator 19 actuates gate circuit 20, the signal from clock pulse generator 10 passes through gate circuit 20 to integrator 21 and delay circuit 22. The number of clock pulses at the output of gate circuit 20 in a period is proportional to the distance to the preceding train or obstacle.

Delay circuit 22 gives a delay of a synchronous period T to the input. Polarity inverter 23 inverts the polarity of the input pulses. The inverted pulses are combined with the pulses coming directly from gate circuit 20 at combiner 24. Combiner 24 transmits pulses of the same polarity as the input only when the pulse either from polarity inverter 23 or gate circuit 20 arrives. The number of the output pulses from combiner 24 in a period is proportional to the relative speed. Positive pulses mean an increasing distance and negative pulses a decreasing distance. Distance signal integrator 21 is an integrator, whose output is cleared to zero, when the synchronous pulses arrive from synchronous pulse generator 11. The output voltage of the integrator just before cleared off is proportional to the distance L. Relative speed signal integrator 25 has the same function as distance signal integrator 21 and the output voltage of the relative speed signal integrator 25 just before clearing off by the clearing signal of the synchronizing signal oscillator, is proportional to the relative speed R. Speedometer 15 is a direct current generator connected to the axle of the train. The output voltage of the speed meter 15 is proportional to the train speed S.

Judgement device 16 receives distance signal D, the relative speed signal R, speed signal S and sampling pulses from delay circuit 26. Each sampling pulse is delayed by a period T from each synchronous pulse and decides the time to sample the values D, R and S for judgement on operation of judgement device 16.

FIG. 6 shows the waveforms at several parts of the circuits to explain radar device 18 and data processor 9. Graph 27 shows the synchronous pulse train of a period T generated by synchronous pulse generator 11. The high frequency pulses are transmitted by radar transmitter 7 at the same time as these synchronous pulses. The operations of radar device 18, data processor 9, and judgement device 16 recur at period T. Graph 28 shows the output of radar receiver 8. The pulses are delayed by the time ta, tb and tc from the synchronous pulse which are proportional to the distance to the preceding train or the obstacle. Graph 29 shows the output of the clock pulse generator 10. Graph 30 shows the durations of "ON" and "OFF" of gate circuit 20. Graph 31 shows pulse trains Pa, Pb, and Pc of the parts of the clock pulses that passed through the gate circuit 20 which are controlled by the time ta, tb and tc respectively. Graph 32 is the output of polarity inverter 23 where the pulses in 31 are just delayed by the period T and inverted to negative. Graph 33 is the output of combiner 24 which adds the output pulse of the gate circuit 20 and the output pulse of the inverter 23. The number of pulses from the combiner is proportional to the difference of the distance during synchronous period T. Graph 34 shows the output of distance signal integrator 21. In graph 34, the integrated values Da, Db and Dc are proportional to the distances between the trains or train and obstacle at each synchronous period. Graph 34 shows the outputs of relative speed signal integrator 25. Graph 36 shows the output of speedometer 15, which is always proportional to the speed of the train. Graph 37 shows the sampling pulse from delay circuit 26 which makes the synchronous pulse delay by the time T'. The input signals to the judgement device are made of the sampled pulses of distance signal Da, relative speed signal Ra and speed signal Sa at some synchronous period. At following synchronous period, the input signals are made Db, Rb and Sb. Judgement device 16 judges the situation of the train operation from these input signals and sends out the command signals to the train operation equipment 17.

Data processor 9 of this invention is based on the digital technique as described above. One of the features of this system is that this system has high accuracy for the relative speed measurement. The relative speed corresponds to change of the distance signal relating to time. The ratio of the change of the distance is comparatively small in a usual case, it is difficult to hold the same accuracy of relative speed measurement by an analog technique, where the relative speed signal is obtained as the difference between two voltages. Since this system makes the time difference convert to the number of pulses using a clock pulse, the accuracy of this system does not depend on the value of distance voltage but on the reoccurrence of the clock pulse. Judgement device 16 has the function to send out the command signal to train operation equipment judging the values of the input sampled signals.

FIGS. 7a, b and c show an example of the function of judgement device 16. The criteria to decide the command signal are divided into three cases according to the value of the speed S of the subject train. FIGS. 7a, b and c show the case of $S \leq S_1$, $S_1 < S < S_2$ and $S_2 \leq S$ respectively $S_1$ is the minimum allowed speed and $S_2$ is the maximum allowed speed of the system. The ordinate is the relative speed R and the abscissa is the distance D. The area decided by each coordinate of FIGS. 7 is divided into three zones, zones I, II and III. When the input signals belong to zone I, judgment device sends the command signal of braking to train operation equipment 17. Zone III denotes propulsion command, zone II denotes the command neither to brake nor to propel. In practice, finer control can be applied with conventional techniques of control systems.

The individual circuits of the data processor 9 and overall judgment circuit 16 are all either well known circuits or easily synthesized, for example, by Design of Transistorized Circuits for Digital Computers by Abraham I. Pressman, copyright March 1959; and Electronic Analog Computers by Granino A. Korn and Theresa M. Korn, second edition, 1956.

The gate circuit 20 is shown and taught in the Pressman reference on pages 96 through 104. Delay circuits 22 and 26 are taught on pages 304 through 307 of the same reference. Polarity inverter 23 is shown in Fig. 6–8 on pages 130 through 131 of the same reference and has the wave form as shown in Fig. 6–9. Combiner 24 is shown in Fig. 1–5(d) on page 13 of the Korn reference which also discloses the integrators 21 and 25 in Fig. 1.5(f) on page 13.

The overall judgment device 16 consists of the function generating circuit shown on pages 290 through 299 and the fundamental logic circuits shown on pages 11 through 33 of the Pressman reference.

The train control device 17 may be any control device as long as it functions such that when the output of the judgment device 16 takes the value of plus, minus or zero, it holds the control train in the condition of acceleration, de-acceleration or free running respectively. Many such power control circuits have been in use and are a widely known technique.

Heretofore, the accuracy obtained by the digital technique employed in the present invention in operation control systems for vehicles following a fixed route has not been realized.

We claim:

1. An operation control system for a subject vehicle following a fixed route having a surface wave transmission line comprising a radar on said vehicle and coupled with said line to successively transmit a pulse and receive the same as reflected from the nearest obstacle in advance of said vehicle, a clock pulse generator, a gate circuit connected with said radar and said clock pulse generator to successively gate the output of said generator and thereby successively produce clock pulse trains proportional in pulse number to the period between transmission and reception of their corresponding radar pulse, circuit means to provide positive or negative comparison pulse reading of said successively gated clock pulse trains, integrating circuit means connected with said gate circuit and said circuit means to provide output wave forms proportional to the distance and relative speed of said vehicle in relation to said obstacle by integration of said gated pulse and said comparison pulse readings respectively, speed measuring means to provide an output wave form proportional to the speed of said vehicle, a vehicle operation control device on said vehicle to control the vehicle speed, and an overall judgment device to combine and evaluate said output wave forms and actuate said control device to control the operation of said vehicle accordingly.

2. The operation control system of claim 1 characterized by a synchronous pulse delay circuit to direct said judgment circuit when to sample said output wave forms 3. The operation control system of claim 1, said surface wave transmission line characterized by an inverse Y-shaped cross section and having a plurality of teeth along the upwardly projecting member of the inverse Y-shaped configuration.

4. The method of processing radar data in a radar operation control system for a subject vehicle following a fixed route to derive the relative speed of the subject vehicle and an obstacle in advance thereof comprising the steps of periodically generating a signal consisting of a number of clock pulses the number of which is determined by the time interval between the transmission of a radar pulse and the reception of the same as reflected from the obstacle, delaying the periodic generation for one full period, inverting the polarity of the delayed periodic generation, combining the inverted delayed periodic generation with a succeeding periodic generation to provide positive or negative comparison pulse reading.

5. The method of processing radar data in a radar operation control system for a subject vehicle following a fixed route having a surface wave transmission line and wherein a control device on the vehicle is actuated to control the vehicle operation by an overall judgment circuit directed from the integration of actual vehicular speed together with the relative speed and distance of the subject vehicle in relation to an obstacle comprising the steps of synchronously transmitting a radar pulse and receiving the same as reflected from the obstacle, generating a clock pulse train having a pulse repetition frequency greater than that of the synchronously transmitted radar pulse, gating the clock pulse train with the reception of each reflected radar pulse and passing the clock pulse with the transmission of each succeeding radar pulse to form a series of pulse trains, delaying each pulse train for one radar synchronous period, inverting the polarity of the delayed pulse train, superimposing the inverted pulse train on the next succeeding non-inverted pulse train to provide a positive or negative comparison pulse train, integrating the gated pulse train to provide an output voltage proportional to the distance, integrating the comparison pulse train to provide an output voltage proportional to the relative speed, generating an output voltage proportional to the speed of the subject vehicle, and evaluating these voltages with reference to predetermined operating criteria to actuate the control device accordingly.

6. The method of claim 5 including the step of synchronously and simultaneously sampling the output voltages to direct the evaluation thereof at the proper time.

7. A radar data processor for a subject vehicle to derive the relative speed of the vehicle in relation to an obstacle in the vehicle path comprising radar means on said vehicle to synchronously transmit a radar pulse and to receive the same as reflected from said obstacle, circuit means connected with said radar means to generate a clock pulse train during each radar synchronous period with a number of clock pulses proportional to the time interval between transmission and reception of the corresponding radar pulse, and computer means connected with said circuit means to compare successive pulse trains and determine an increase or decrease and the difference in pulse number therebetween.

8. The radar data processor of claim 7 characterized in that said circuit means consists of a clock pulse generator connected with a gate circuit operable to pass the clock pulse train generated from said clock pulse generator with the transmission of each synchronous radar pulse and to gate the same with the reception of each radar pulse as reflected from the obstacle.

9. The radar data processor of claim 8 characterized in that said computer means consists of a delay circuit connected to the output of said gate circuit to delay each pulse train for one radar synchronous period, an inverter circuit connected to the output of said delay circuit to invert the polarity of each delayed pulse train, and a combiner circuit connected with the output of said gate circuit and said inverter circuit to superimpose each inverted delayed pulse train on the succeeding pulse train leaving said gate circuit and provide a positive or negative comparison pulse train.

10. An operation control system for a subject vehicle following a fixed route having a surface wave transmission line and wherein a vehicle operation control device on said vehicle is actuated by an overall judgment device directed from the integration of the vehicular speed and the relative speed and distance of the subject vehicle in relation to an obstacle in the path of said vehicle and comprising a synchronous pulse generator which synchronously generates a pulse of a pulse repetition period T, a pulse modulated wave transmitter coupled with said transmission line to excite the same and connected with said synchronous pulse generator to transmit a pulse modulated wave with each synchronous pulse generation, a pulse modulated receiver coupled with said transmission line to receive the transmitted pulse modulated wave as reflected from said obstacle, a clock pulse generator to generate a clock pulse having a pulse repetition frequency greater than that of said synchronous pulse, a gate circuit connected with the outputs of said synchronous pulse generator and said clock pulse generator and said receiver to open said gate circuit with the generation of each synchronous pulse and pass said repetitive clock pulse and close said gate circuit with the reception of each reflected pulse modulated wave to provide a clock pulse train having a number of pulses proportional to the distance of said vehicle from said obstacle, circuit means connected with the output of said gate circuit to invert the polarity of said clock pulse train and delay the same for one synchronous period T and superimpose said inverted clock pulse train on the succeeding pulse train from the gate circuit and thereby produce a positive or negative comparison pulse train proportional in number and polarity to the relative speed of said vehicle in relation to said obstacle, integrating circuit means connected with said gate circuit and said circuit means to provide an output wave form proportional in magnitude to said distance and an output wave form proportional in magnitude and polarity to said relative speed by integration of said clock pulse train and said comparison clock pulse train respectively, speed measuring means to provide an output wave form proportional in magnitude to the speed of said vehicle, a judgment device connected with the output of said integrating circuit means and said speed measuring means to simultaneously sample and evaluate said output wave forms with reference to predetermined operating criteria and produce an output command signal compatible with said evaluation, a delay circuit connected with said judgment device to govern the time of said sampling, and a vehicle operation control device connected to the output of said judgment device and operable to control the speed of said vehicle in compliance with said command signal.

11. The method of processing radar data in a radar operation control system for a subject vehicle to derive the relative speed of the subject vehicle in relation to an obstacle in the vehicle path comprising the steps of synchronously transmitting a radar pulse and receiving the same as reflected from the obstacle, generating a clock pulse train, successively gating the clock pulse train during each synchronous period for a time interval regulated by the time elapsing between transmission and reception of each corresponding synchronously transmitted radar pulse to form a series of clock pulse trains with each proportional in number to the distance between the vehicle and the obstacle for its corresponding radar synchronous period, and comparing successive pulse trains to determine an increase or decrease and the difference in pulse number.

12. The method of claim 11 wherein the step of comparing includes the steps of delaying each gated clock pulse train for one synchronous period, inverting each delayed clock pulse train, and superimposing each inverted delayed clock pulse train on a succeeding gated pulse train to produce a positive or negative comparison pulse train.

References Cited

UNITED STATES PATENTS

| | | | |
|---|---|---|---|
| 2,702,342 | 2/1955 | Korman | 246—30 |
| 3,246,324 | 4/1966 | Price | 343—5 X |

RODNEY D. BENNETT, *Primary Examiner.*

T. H. TUBBESING, *Assistant Examiner.*